(No Model.)
A. J. SMITH.
ELECTRIC ACCUMULATOR OR SECONDARY BATTERY.
No. 519,482. Patented May 8, 1894.
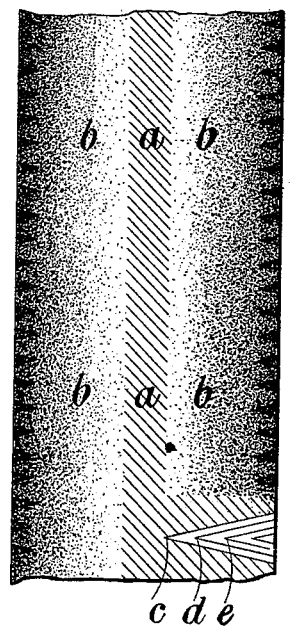

UNITED STATES PATENT OFFICE.

ARTHUR JAMES SMITH, OF LONDON, ENGLAND, ASSIGNOR OF ONE-HALF TO HENRY JOHN WRIGHT, OF SAME PLACE.

ELECTRIC ACCUMULATOR OR SECONDARY BATTERY.

SPECIFICATION forming part of Letters Patent No. 519,482, dated May 8, 1894.

Application filed July 20, 1893. Serial No. 481,041. (No model.) Patented in England August 13, 1892, No. 14,658; in France July 10, 1893, No. 231,437; in Belgium July 10, 1893, No. 105,496; in Sweden July 15, 1893, No. 4,938, and in Italy August 3, 1893, LXVII, 450.

*To all whom it may concern:*

Be it known that I, ARTHUR JAMES SMITH, chemist, a subject of the Queen of Great Britain, residing at Kingston-upon-Thames, London, in the county of Surrey, England, have invented certain new and useful Improvements Relating to Electric Accumulators or Secondary Batteries and to the Manufacture of Plates or Electrodes Therefor, (for which I have obtained Letters Patent in Great Britain, No. 14,658, dated August 13, 1892; in France, No. 231,437, dated July 10, 1893; in Belgium, No. 105,496, dated July 10, 1893; in Sweden, No. 4,938, dated July 15, 1893, and in Italy, application filed July 18, 1893, and patent issued LXVII, 450, August 3, 1893,) of which the following is a specification.

My invention relates to electric accumulators or secondary batteries and to the manufacture of plates or electrodes therefor, and is chiefly designed to facilitate and augment the electro-chemical actions and re-actions which take place in the accumulator, and thus increase the efficiency of the same in proportion to its dimensions and weight as compared with the accumulators hitherto devised.

My said invention relates more particularly to accumulators or secondary batteries of the kind or class wherein lead plates or electrodes are employed, and wherein the storage of energy is effected by the de-oxidation of one of the lead electrodes and the peroxidation of the other electrode. The electrodes for accumulators of this kind or class are usually made by first coating or covering lead plates with a suitable oxide of lead and then subjecting the same to the action of electric currents in the accumulator. And in most of the endeavors hitherto made to increase the efficiency and durability of accumulators of this kind or class, the aim of the inventor has been to produce a lead plate or electrode having as large a superficial area in proportion to its weight as is consistent with the proper strength and durability of the said plate or electrode, in order to have as large a surface of the metallic lead as practicable in contact with the active material. This result has, in some measure, been obtained by making the electrodes of perforated plates or gratings, the holes or cells of such plates or gratings being filled with the active material. It has also been proposed to make the electrodes by subjecting masses of lead wire or the like to compression so as to produce what are termed "felted" plates, which are then "formed" into the electrodes in the well-known manner, that is to say, by causing the alternate de-oxidation and peroxidation of the electrodes by repeated charging and discharging of the accumulator, with reversals of the current if necessary. It has also been proposed to make plates or electrodes by agglomerating under pressure, mixtures of lead oxides with lead filings or the like, or with ammonium sulphate and other substances.

I am aware also that it has been further proposed to produce lead plates of great porosity by minutely puncturing one or both surfaces of sheets or plates of lead by means of reciprocating needles, then oxidizing or chemically treating the punctured plates, and then folding, pressing and repuncturing them, these operations being repeated as often as may be required to produce electrodes of great porosity. The result sought to be attained has always been to bring as much as possible of the metallic lead into contact with the active material or to expose as large a surface as practicable to contact with the electrolyte. But I am not aware that any suggestions have heretofore been made for facilitating and augmenting the electro-chemical actions and reactions in the accumulator by the intimate intermingling and kneading of the particles of the lead oxide with those of the metallic lead in the manner hereinafter described.

Now according to my invention, I take sheets or plates of lead of any suitable dimensions and cover or coat the same with a suitable oxide of lead and cause the particles of the said oxide, by means of a mechanical process or kneading, to intermingle very intimately with those of the metallic lead on one or both sides of the plate. I repeat these operations of covering or coating the plates with oxide and driving or kneading such oxide into the metal until the mixture of oxide with metallic lead extends into the plate to a suitable depth preferably leaving a portion or layer of the metallic lead solid or undisturbed in the middle of the plate or at one side of the plate as the case may be, to afford an efficient support for the active material and a path of sufficient conductivity for the electric current.

In carrying my said invention into practice, I find it advantageous to proceed as follows, that is to say:—I first spread upon the lead plate, by any convenient means a layer of minium or other suitable oxide of lead, preferably in the form of dry powder, and, if desired, I moisten the said oxide with the electrolytic solution, such, for instance, as sulphuric acid and water, I then force or knead the particles of such oxide into the lead plate and thus intimately mix them with the particles of the metallic lead by repeatedly driving into the plate covered with the oxide, a bundle of needles or pointed rods. More lead oxide is applied to the plate and kneaded into the same from time to time as may be required. I treat in this manner both the negative and the positive, or, in other words, the de-oxidized and the peroxidized plates, and one or both sides of each plate as may be desired.

I do not confine myself to the use of any particular devices for driving the pointed rods or needles into the plate to effect the intermingling or kneading of the particles of oxide with those of the lead plate; I prefer, however, that the desired result should be accomplished by percussion, so that the particles of oxide and of metallic lead will be intermingled and kneaded in such a manner as to insure the cohesion of the greatest practicable number of the particles of oxide with particles of the metallic lead.

In making my improved electrodes, it is preferable to employ, for the forcing or kneading of the oxide into the metal plate, pointed rods or needles having conical points and to drive the said needles simultaneously into the plate covered or coated with the oxide, by percussion by means of a light hammer or by other suitable means. The oxide should be applied as uniformly as practicable over the surface or surfaces of the plate, and the driving or kneading of the oxide into the metal should also be effected as uniformly as practicable. The most advantageous and economical results are obtained by the use of a machine in which the pointed rods or needles are attached to an oscillating or vibrating arm or to a reciprocating holder, and the plate is fed regularly beneath the said needles, or the holder carrying the needles is fed regularly relatively to the work. Plates or electrodes of great efficiency and durability can be produced by such means, as the greater the uniformity of the kneading-in of the oxide, the greater will be the durability of the plates or electrodes and the greater the storage capacity of the accumulator in proportion to its weight.

By repeatedly subjecting the plate to the aboved described operations a great number of times, the oxide of lead is driven a considerable distance into the plate and the particles of metallic lead are repeatedly displaced and compressed or condensed, and the particles of the oxide and those of the metallic lead are caused to cohere by the kneading action above mentioned. Moreover the proportion of particles of oxide to particles of lead gradually diminishes toward the middle of the plate, thus grading or graduating the conductivity of the plate from its center to its surfaces. To more effectually insure such graduation of the conductivity of the plate, I sometimes provide interchangeable guards adapted to be placed upon the bundle of needles or pointed rods so that the depth of the holes formed thereby may be gradually diminished as the operation proceeds. Or the desired result is attained by regulating the stroke or travel and percussive force of the needles or pointed rods. I find that the finer the cells formed by the needles or points and the oftener the kneading operation is repeated, the greater is the capacity or storage power of the accumulator, and the power of the plates to resist flexure or buckling under the influence of the charging and discharging of the accumulator.

The manipulation of the plate can, if desired, be carried on in the manner above described, until nearly the whole of the substance of the electrode consists of a mixture of particles of oxide with particles of metallic lead. As, however, an electrode so made would in itself have no efficient support or conductivity, it is preferable to make the electrode with a layer of solid metal between two layers of the mixture of lead oxide and metallic lead, by regulating the stroke or travel and momentum of the kneading tool. It is desirable, in all cases, that the kneading of the oxide into the metal should not be carried on to such an extent as to cause disintegration of the electrode.

In the accompanying drawing I have shown in transverse section a portion of one of my improved plates or electrodes drawn to a greatly enlarged scale. In this plate, there is a central conducting and supporting layer $a$ of solid metal having no oxide mixed therewith. On either side of this layer $a$ there is a layer or stratum $b$ of metal into which particles of the metallic oxide have been kneaded as above described, in such a manner as to graduate the conductivity of the plate, that is to say, in first operating upon the lead plate with the needles, after a coating or covering of oxide has been applied to the said plate, the needles are driven into the plate as far as the point $c$; in the next operation, the needles are driven in only as far as the point $d$, in the next only as far as the point $e$ and so on. The conical cells formed by the final puncturing of the plate with the pointed rods or needles are then filled up with oxide of lead. Each side of the plate is treated in this manner; therefore the metal on either side of the layer $a$ has gradually more and more oxide combined with it until at the surface there is a mixture of oxide of lead with but a small proportion of metal or there may be a thin layer of oxide on the surface of the plate.

I find that a plate treated as above described produces better results in respect of storage capacity as well as in respect of freedom from buckling or warping of the plate, than any of the lead electrodes heretofore generally used in secondary batteries.

The use of needles with conical points affords the further advantage that any expansion of the active material or increase by discharge, which may take place, will simply cause outward or lateral movement or swelling of the said material in the small conical cells formed by the driving of the needles into the plate, and will not have any tendency to cause buckling or warping of the electrode.

I wish it understood that in the term plate or electrode I include any lead surface which will serve the purpose of my invention.

It will be seen from the foregoing description that I do not roll or fold the punctured plates, but I repeatedly coat or cover the surface of the plate with the oxide and drive or knead each coating or covering of oxide into the metal, the density of the plate being thus increased. By manufacturing the plates or electrodes in this manner, I am enabled to dispense with the process hitherto practiced of "forming" the electrodes by the action of electric currents, my improved accumulator being ready for use as soon as the said plates and the electrolyte are introduced into the cells. Moreover, I greatly increase the capacity of the plates for occluding the gases, and correspondingly augment the storage power of the accumulator and its capacity for rapid charging and discharging as compared with the accumulators heretofore devised, and at the same time obviate many of the defects of the accumulators hitherto employed, such as the liability to disaggregation of the active material and to the falling of the same from its support. Furthermore by my improved method or process, I can produce efficient and durable lead plates for accumulators at a lower cost than is practicable by the methods or processes hitherto adopted. I can, if desired, use lead alloys instead of pure lead in the production of my improved plates or electrodes. I find, however, that it is preferable to use pure soft lead.

Instead of applying the oxide to the plate in the form of powder, I sometimes form a coating of oxide on the plate by any well-known and suitable chemical process.

What I claim is—

1. The improved method or process of manufacturing a plate or electrode for a secondary battery or accumulator, consisting in repeatedly covering or coating a metal sheet or plate with the metallic oxide and driving or kneading such oxide into the metal by means of pointed rods or needles, substantially as hereinbefore described.

2. A plate or electrode for a secondary battery, having a layer $a$ of solid metal and a layer of stratum $b$ composed of particles of active material intermingled or kneaded with the metal, the proportion of particles of active material to particles of metal increasing gradually from the said solid layer to the surface of the plate, whereby the conductivity of the said plate is graduated, substantially as and for the purpose set forth.

ARTHUR JAMES SMITH.

Witnesses:
 JOHN T. KNOWLES,
 H. W. LYNDEN,
*Both of 11 and 12 Southampton Buildings, London, W. C.*